US006410305B1

(12) United States Patent
Miller et al.

(10) Patent No.: US 6,410,305 B1
(45) Date of Patent: Jun. 25, 2002

(54) TREATMENT OF ANIMAL WASTE

(75) Inventors: Guy W. Miller, Minneapolis; Gregory Scott Patterson, Hopkins, both of MN (US)

(73) Assignee: BioSun Systems Corporation, Maple Grove, MN (US)

(*) Notice: Subject to any disclaimer, the term of this patent is extended or adjusted under 35 U.S.C. 154(b) by 0 days.

(21) Appl. No.: 09/398,727

(22) Filed: Sep. 17, 1999

Related U.S. Application Data

(63) Continuation-in-part of application No. 08/905,573, filed on Aug. 4, 1997, now Pat. No. 5,958,758.

(51) Int. Cl.$^7$ .............................................. C07G 15/00
(52) U.S. Cl. ........................ 435/268; 435/836; 435/838; 435/839; 435/842; 435/856; 426/2; 210/611; 210/613; 424/76.5; 424/76.6
(58) Field of Search .............................. 435/262.5, 268, 435/832, 836, 838, 839, 842, 856; 426/2; 71/15; 210/601, 610, 611, 613; 424/76.5, 76.6

(56) References Cited

U.S. PATENT DOCUMENTS

| | | | |
|---|---|---|---|
| 3,878,303 A | | 4/1975 | Hashimoto .................... 426/56 |
| 4,467,035 A | | 8/1984 | Harasawa et al. ........... 435/253 |
| 4,996,055 A | * | 2/1991 | Kurasawa .................... 424/442 |
| 5,271,845 A | | 12/1993 | Paquin |
| 5,464,766 A | * | 11/1995 | Bruno ......................... 435/187 |
| 5,627,069 A | | 5/1997 | Powlen ........................ 435/267 |
| 5,707,856 A | * | 1/1998 | Higa ........................... 435/262 |
| 5,733,355 A | * | 3/1998 | Hibino et al. .................... 71/6 |

FOREIGN PATENT DOCUMENTS

| | | |
|---|---|---|
| DE | 025 07 111 | 9/1976 |
| JP | 60-000895 | 1/1985 |
| SU | 0 766 631 | 9/1980 |

OTHER PUBLICATIONS

[Author unknown]_____ (1993) "Treatment of Hydrogen Sulphide", *W&WT*, pp. 30–31.

Amon, Marko et al. (1995) "Odour and ammonia emissions from broiler houses: a farm scale study on the use of De–Odorase® and clinoptilolite zeolite", Proceedings '95—New Knowledge in Livestock Odor Solutions; International Livestock Odor Conference '95, Iowa State University of Science and Technology, Ames, Iowa (56–60).

Barker, James C. (Jan. 1983, Rev. 90) "Lagoon Design and Management for Livestock Waste Treatment and Storage", *Agri–Waste Management*, North Carolina Agricultural Extension Service, North Carolina University, Raleigh, NC (1–10).

Barrington, S. et al. (1995) "Zeolite to Control Swine Manure Odours and Nitrogen Volatilization", Proceedings '95—New Knowledge in Livestock Odor Solutions; International Livestock Odor Conference '95, Iowa State University of Science and Technology, Ames, Iowa (65–68).

Barrington, S. F. (1995) "Biological Additives and Biofilters", Proceedings '95—New Knowledge in Livestock Odor Solutions; International Livestock Odor Conference '95, Iowa State University of Science and Technology, Ames, Iowa (185–191).

Beaudet, R., et al. (Apr. 1990) "Microbiological Aspects of Aerobic Thermophilic Treatment of Swine Waste", *Applied and Environmental Microbiology* 56(4):971–976.

Bourque, Denis, et al. (Jan. 1987) "Microbiological Degradation of Malodorous Substances of Swine Waste under Aerobic Conditions", *Applied and Environmental Microbiology* 53(1):137–141.

Brune, Daniel C. (1989) "Sulfur oxidation by phototrophic bacteria", *Biochimica et Biophysica Acta*, 975:189–221.

Buchanan, R. E., et al. (1984) *Bergy's Manual of Determinatiave Bacteria*, 10th Ed., Williams & Wilkins Co., Baltimore, MD, pp. 1636–1638; 1660–1661; 1683; 1696–1697; 1707–1708; and 1834–1837.

Bundy, Dwaine S., et al. (1995) "Evaluation of Alkaline By–Products for the Control of Swine Odors in Manure Storage", Proceedings '95—New Knowledge in Livestock Odor Solutions; International Livestock Odor Conference '95, Iowa State University of Science and Technology, Ames, Iowa (73–76).

Clark, Charles E. (Dec. 1965) "Hog Waste Disposal by Lagooning", *Journal of the Sanitary Engineering Division—Proceedings of the American Society of Civil Engineers*; SA 6 (27–39).

Cole, C. et al., 1985, *Managing Livestock Wastes*, 374–377 "Odor Control of Liquid Dairy and Swine Manure Using Chemical and Biological Treatments".

Cooper, Robert C. (___) "Treatment of Organic Industrial Wastes by Lagooning", _____ (351–364). (full citation date and journal are unknown).

(List continued on next page.)

*Primary Examiner*—David A. Redding
(74) *Attorney, Agent, or Firm*—Michael S. Sherrill

(57) ABSTRACT

A process and composition for treating an animal waste in a waste holding facility to reduce sulfides and enhance efficient degradation of large amounts of organic matter with reduced odor. The process includes administering a probiotic material capable of promoting organic digestion to an animal and maintaining a sulfide gas concentration of less than 10 ppm from a waste produced by the animal. Maintaining a low sulfide gas concentration can be done by adding an innoculum of sulfide-utilizing bacteria to the waste produced by the animal.

56 Claims, No Drawings

OTHER PUBLICATIONS

Cunnick, Joan E. (1995) "Implications of Environmental Odor on Psychological Status and Health", Proceedings '95—New Knowledge in Livestock Odor Solutions; International Livestock Odor Conference '95, Iowa State University of Science and Technology, Ames, Iowa (156–159).

DiPietre, Dennis, et al. (1995) "An Economic Analysis of Resource Recover and Odor Reduction: Premium Standard Farms Digester Cover Project", Proceedings '95—New Knowledge in Livestock Odor Solutions; International Livestock Odor Conference '95, Iowa State University of Science and Technology, Ames, Iowa (77–79).

Evans, M. R, et al. (1986) "Aeration and Control of Slurry Odours by Heterotrophs", *Agriculture Wastes*, 15:187–204.

Evans, M. R., et al. (1983) "The Effect of Temperature and Residence Time on Aerobic Treatment of Piggery Slurry—Degradation of Carbonaceous Compounds", *Agricultural Wastes* 5:25–36.

Evans, M. M., et al. (1986) "Nitrogen And Aerobic Treatment of Slurry", *Agricultural Wastes* 15:205–213.

Fulhage, Charles (1995) "Design and Management of Lagoons to Minimize Odor", Proceedings '95—New Knowledge in Livestock Odor Solutions; International Livestock Odor Conference '95, Iowa State University of Science and Technology, Ames, Iowa (196–199).

Fulhage, Charles (1995) "Manure Storage", Proceedings '95—New Knowledge in Livestock Odor Solutions; International Livestock Odor Conference '95, Iowa State University of Science and Technology, Ames, Iowa (192–193).

Ginnivan, M. J. (1983) "The Effect of Aeration Rates on Odour and Solids of Pig Slurry", *Agricultural Wastes* 7:197–207.

Goodrich, Philip R. et al. (1995) "Odor Reduction in Swine Manure using Bubbleless Oxygenation", Proceedings '95—New Knowledge in Livestock Odor Solutions; International Livestock Odor Conference '95, Iowa State University of Science and Technology, Ames, Iowa (2–4).

Hashimoto, Andrew G. (1983) "Thermophilic and Mesophilic Anaerobic Fermentation of Swine Manure", *Agricultural Wastes* 6:175–191.

Hobbs, Dr. Philip (1995) "Dietary Control of Odors", Proceedings '95—Knowledge in Livestock Odor Solutsions: International Livestock Odor Conference '95, Iowa State University of Science and Technology, Ames Iowa (200–202).

Hobbs, Dr. Philip et al. (1995) "Odor Reduction in Fresh Pig Slurry by Dietary Manipulation of Protein", Proceedings '95—New Knowledge in Livestock Odor Solutions; International Livestock Odor Conference '95, Iowa State University of Science and Technology, Ames, Iowa (5–10).

Høyvik, Henrik, et al. (1995) "FYMOL™: An Environmentally Friendly Method to Control Odor from Manure", Proceedings '95—New Knowledge in Livestock Odor Solutions; International Livestock Odor Conference '95, Iowa State University of Science and Technology, Ames, Iowa (102–105).

Jolly, Robert, et al. (1995) "Economic Issues in Livestock Odor Reduction", Proceedings '95—New Knowledge in Livestock Odor Solutions; International Livestock Odor Conference '95, Iowa State University of Science and Technology, Ames, Iowa(163–167).

Joye, Samantha B. et al. (1995) "Influence of Sulfide Inhibition of Nitrification on Nitrogen Regeneration in Sediments", *Science*, 270:623–625.

Kotz, Kevin (Nov. 13, 1984) "Good bugs' getting the job done in city's sewage lagoons", *The Redwood Gazette*, Redwood Falls, Minnesota, No. 30.

Lawrence, Alonzo W., et al., (1990) "The Effects Of Sulfides On Anaerobiv Treatment", _____, pp. pp. 343–347. (journal uknown).

Lohr, Luanne (1995) "Factors Related to Odor Perceptions and Annoyance in a Rural Context", Proceedings '95—New Knowledge in Livestock Odor Solutions; International Livestock Odor Conference '95, Iowa State University of Science and Technology, Ames, Iowa (22–27).

McFarlane, Paul N., et al. (___) "The Occurrence of Purple Sulfur Bacteria in Anaerobic Lagoons—Theory and Application", _____, pp. ___. (full citation unknown).

Melvin, Stewart W. (1995) "Manure Storage", Proceedings '95—New Knowledge in Livestock Odor Solutions; International Livestock Odor Conference '95, Iowa State University of Science and Technology, Ames, Iowa (203–205).

Mézáros, György, et al. (1985) "Minimizing Odour and Slurry Emission of Pig Husband by Biofilter and Litter Housing System", Proceedings '95—New Knowledge in Livestock Odor Solutions; International Livestock Odor Conference '95, Iowa State University of Science and Technology, Ames, Iowa (111–113).

Miner, J. Ronald (1995) "Chemical Additives", Proceedings of '95—New Knowledge in Livestock Odor Solutions; International Livestock Odor Conference '95, Iowa State University of Science and Technology, Ames, Iowa (206–207).

Miner, J. Ronald et al. (1995) "A Floating Permeable Blanket to Prevent Odor Escape", Proceedings '95—New Knowledge in Livestock Odor Solutions; International Livestock Odor Conference '95, Iowa State University of Science and Technology, Ames, Iowa (28–34).

O'Neill, D. H., et al. (1991) "A Review of the Control of Odour Nuisance from Livestock Buildings: Part 1, Influence of the Techniques for Managing Waste Within the Building", *J. Agric. Engng Res.* 50:1–10.

O'Neill, D. H., et al. (1992) "A Review of the Control of Odour Nuisance from Livestock Buildings: Part 2, The Costs of Odour Abatement Systems as Predicted from Ventilation Requirements", *J. Agric. Engng Res.* 51:157–165.

O'Neill, D. H., et al. (1992) "A Review of the Control of Odour Nuisance from Livestock Buildings: Part 3, Properties of the Odourous Substance which have been Identified in Livestock Wastes or in the Air around them", *J. Agric. Engng Res.* 53:23–50.

Patterson, Charles T. (1995) "The Litigation Aspects of Livestock Odor Control", Proceedings '95—New Knowledge in Livestock Odor Solutions; International Livestock Odor Conference '95, Iowa State University of Science and Technology, Ames, Iowa (172–181).

Person, Howard, et al. (1995) "Recommended Human Relations Management Practices Within a Technological and Social System Involving Livestock Odor Issues", Proceedings '95—New Knowledge in Livestock Odor Solutions; International Livestock Odor Conference '95, Iowa State University of Science and Technology, Ames, Iowa (211–214).

Postgate, John (1959) "Sulphate Reduction by Bacteria", *Annual Review of Microbiology* 13:505–520.

Powers, Wendy J. Ph.D. et al. (1995) "Effect of Anaerobic Digestion and Commercial Additives on Odors from Liquid Dairy Manure", Proceedings '95—New Knowledge in Livestock Odor Solutions; International Livestock Odor Conference '95, Iowa State University of Science and Technology, Ames, Iowa (44–49).

Sievers, D. M. et al. (1994), "Treatment of Dilute Manure Wastewaters by Chemical Coagulation", *Translations of the ASE* 37(2):597–601.

Sletten, Owen, et al. (1971) "Sulfur Bacteria in Red Lagoons", *Journal WPCF* 43(10):2118–2122.

Summer, R., et al. (1980) "A Detailed Study of Piggery--Waste Anaerobic Digestion", *Agriculturas Wastes* 2:61–78.

Sutton, A. L., et al. (1995) "Changing Nitrogen Levels in Swine Diets to Reduce Manure Odors", Proceedings '95—New Knowledge in Livestock Odor Solutions; International Livestock Odor Conference '95, Iowa State University of Science and Technology, Ames, Iowa (127–129, and table).

Van Lotringen, Theo J. M., et al. (Oct. 23, 1985?___)"$H_2S$ Removal By Purple Sulfur Bacteria in Swine Waste Lagoons", _____ (___).____, pp. _____. (full citation unknown).

Wachenheim, Cheryl, et al. (1995) "Testing the Efficiency of Commercially Available Feed Additives as a Means to Improve Pig Performance and Air Quality", Proceedings '95—New Knowledge in Livestock Odor Solutions; International Livestock Odor Conference '95, Iowa State University of Science and Technology, Ames, Iowa (145–148).

Weaver, D. M., et al. (1994), "Phosphorous Removal from Piggery Effluents of Varying Quality Using Lime and Physico–Chemical Treatment Methods", *Environment Pollution* 84:237–244.

Welsh, F. W., et al. (1977) "The Effect of Anaerobic Digestion Upon Swine Manure Odors", *Canadian Agricultural Engineering* 19(2):122–126.

Westerman, Philip W., et al. (1995) "Aerobic Treatment of Animal Waste for Odor Control", Proceedings '95—New Knowledge in Livestock Odor Solutions; International Livestock Odor Conference '95, Iowa State University of Science and Technology, Ames, Iowa (218–222).

Wilkie, Ann C., et al. (1995) "Anaerobic Treatment Technology—An Integrated Approach to Controlling Manure Odors", Proceedings '95—New Knowledge in Livestock Odor Soltutions; International Livestock Odor Conference '95, Iowa State University of Science and Technology, Ames, Iowa (223–227).

Williams, A. G., et al. (1989) "The Oxygen Requirememts for Deodorizing and Stabilizing Pig Slurry by Aerobic Treatment", *J. Agric. Engng Res.* 43:291–311.

Williams, C. M. (Mike), et al. (1995) "Livestock Odor Control Additives: Effectiveness and Laboratory–Scale Protocol for Evaluation", Proceedings '95—New Knowledge in Livestock Odor Solutions; International Livestock Odor Conference '95, Iowa State University of Science and Technology, Ames, Iowa (50–53).

Williams, C. M. (1995) "Odor Control Additives: Protocol for Evaluation", In Nuisance Concerns in Animal Manure Managment: Odors and Files—*Proceedings of Conference held Mar. 21–22, 1995, Gainsfille, FL*, p. 36–43.

* cited by examiner

TREATMENT OF ANIMAL WASTE

RELATED APPLICATIONS

This is a continuation-in-part of U.S. Ser. No. 08/905,573, filed Aug. 4, 1997, now U.S. Pat. No. 5,958,758, which application is expressly incorporated herein.

FIELD OF THE INVENTION

The present invention relates generally to the storage and treatment of animal wastes generated at facilities where animals such as hogs or cattle are raised. More particularly, the invention relates to a microbial process for treating organic waste materials in waste holding facilities in order to reduce the sulfide content and enhance efficient degradation of the waste without significant odor.

BACKGROUND OF THE INVENTION

The raising of large numbers of animals such as hogs and cattle for human consumption leads to the production of large amounts of organic waste materials. Typically, the organic waste material is collected and maintained in animal waste holding facilities, pits, or lagoons. Theoretically, bacteria in the waste materials work in concert to degrade organic matter over time.

Stresses placed on the ecology of the facility, including overloading of organic matter, changes in pH, temperature, and the like, disturb the ecology of the facility. Sulfide-producing bacteria dominate in a stressed facility, producing sulfides that are toxic to the growth and degradation activities of microorganisms. This results in a system that is inefficient in degrading wastes and continues to produce large amounts of hydrogen sulfides, volatile fatty acids, ammonia, and other malodorous compounds that create an unhealthy biomass in the waste facility.

Attempts to add organic digesting bacteria to a stressed, sulfide-rich facility have had limited success, due to the unfavorable conditions for their growth. Sulfur-degrading bacteria have been used to oxidize sulfides in some systems, but the effect is short-lived and fails to completely detoxify the facility and/or degrade organic matter.

There is a need and demand for a process for treating animal waste in a holding facility to create a healthy biomass to efficiently degrade organic waste and control solids build-up without toxicity and importantly, without the odors caused by sulfides, ammonia, and volatile fatty acids.

SUMMARY OF THE INVENTION

The present invention provides a process for the treatment of large amounts of organic waste in a holding facility, which process reduces sulfide levels to that which are non-toxic to organic digesting bacteria. The process provides an appropriate microbial environment and enhances efficient degradation of large amounts of organic wastes without toxicity, organic matter build up, and without odors caused by sulfides, ammonia, and volatile fatty acids.

The process of the invention includes administering to an animal a probiotic material capable of promoting organic digestion and maintaining a sulfide gas concentration of less than 10 ppm from a waste produced by the animal. The process of the invention also includes administering a probiotic material, capable of promoting organic digestion, to an animal and adding an innoculum of sulfide-utilizing bacteria to the waste produced by the animal. The process of the invention further includes administering to an animal a probiotic feed that includes organic digesting bacteria and lytic enzymes. Then an innoculum comprising sulfide-utilizing bacteria is added to a waste produced by the animal. The process of the invention further includes administering to an animal a probiotic feed additive that includes organic digesting bacteria and lytic enzymes. Then an innoculum comprising sulfide-utilizing bacteria is added to a waste produced by the animal. The invention further includes a probiotic feed additive composition.

DETAILED DESCRIPTION OF THE PREFERRED EMBODIMENT

For the purposes of understanding the invention, reference is now made to the preferred embodiments. No limitation of scope is intended by this description.

Definitions

The following terms have the described definition for purposes of this invention:

"Waste holding facility"—A facility for the holding, storage, and treatment of organic wastes, particularly animal waste, such as a pit or lagoon. This term also encompasses organic waste from sources other than animals, such as for example, plant waste and the like. The facility is exemplified by those found in large animal farms such as those raising hogs or cattle.

"Treating"—Treating means inoculating organic waste and/or the animal with a bacteria and/or enzymes designed to enhance efficient degradation of organic matter with reduced odors. This team also encompasses the addition of probiotic material to the animal.

"Sulfide-rich organic waste" is defined as malodorous animal waste harboring sulfide compounds, which waste is beneficially treated by the process of the invention. In general, the filtered sulfide content of the sulfide-rich animal waste ranges from about 1 mg/l to about 150 mg/l or greater. This term also encompasses organic waste from sources other than animals, such as for example, plant waste and the like. "Innoculum"—One or more bacteria, enzymes, *yucca schidigera*, ferrous chloride and oxidizing agents such as, for example, oxygen, halogen gases and the like, added to the organic waste material in the waste facility. The innoculum may be dried or fluid, mixed with a carrier or medium, and may include one or a mixture of bacteria, enzymes, *yucca schidigera*, ferrous chloride and oxidizing agents.

"Sulfide-utilizing bacteria"—Bacteria capable of utilizing sulfide, which may be anaerobic, aerobic, or facultative. Preferred is a consortium of sulfide-utilizing bacteria that includes bacteria which oxidize sulfide compounds. Most preferred is a consortium that includes bacteria capable of internalizing sulfur. Examples of useful sulfide-utilizing bacteria are found, for example, in Bergy's Manual, and include species of Purple Non-Sulfur Bacteria (e.g., Rhodospirillium), Chromatianeae (e.g., Chromatium), Green Sulfur Bacteria (e.g., Chlorobium), Colorless Sulfur Bacteria (e.g., Thiobacaterium), and Filamentous Green bacteria (e.g., Chloroflexus). A preferred mixture of sulfide-utilizing bacteria including Rhodospirillium, Chromatium and Thiobacillus is commercially available from Syneco Systems, Inc. (St. Louis Pk, Minn.) under the trade name Persnickety Brand 713™.

"Lowered-sulfide waste"—A lowered-sulfide waste of the invention is a waste treated with sulfide-utilizing bacteria to decrease the content of sulfides. In general, a lowered-sulfide waste is a treated waste capable of sustaining growth and activity of organic digesting bacteria. The filtered sulfide content of the lowered-sulfide waste can range from about 0.5 mg/l or less to about 5 mg/l or less. It is appreciated that the lower the content of sulfide in the waste, the more efficient the organic digesting bacteria.

"Filtered sulfide"—The filtered sulfide content of animal waste in an animal waste facility is determined using standard methods and analysis, for example method EPA 375.4. In general, a sample of the waste slurry is filtered to remove solids, and the filtrate is analyzed for sulfide content. In general, the filtered sulfide content of a sample is about 30–40% of the sample's measured solids sulfide content.

"Organic digesting microorganisms"—Organic digesting microorganisms of the present invention are those bacteria, yeast, and fungi, which degrade organic matter commonly found in animal wastes. The organic digesting bacteria may be aerobic, anaerobic, or facultative. Preferably, the organic digesting bacteria of the invention produce lytic enzymes such as proteases, lipases, hemicelluases, cellulases, esterases, xylanase, urease, phytase and amylases that degrade organic matter. Also preferred are bacteria that utilize ammonia and volatile fatty acids. Useful organic digesting bacteria include species of Bacillus, Clostridium, and Deinococcus. Particularly useful is a consortium of bacteria capable of a variety of degradation activities. For example, a commercial mixture of organic digesting bacteria including *licheniformis, pumilus, subtilus, amyloliquefaciens* and *megaterium* provided with a mixture of lytic enzymes from Athea Labs (Milwaukee, Wis.) under the trade name Digestase 900™ is particularly useful.

"Lytic enzymes"—Herein, lytic enzymes are defined as those enzymes capable of degrading organic matter typically found in animal waste facility. Useful lytic enzymes include proteases, lipases, cellulases, hemicelluases, phytases and amylases. A preferred mixture of lytic enzymes is commercially available with a mixture of organic digesting bacteria as described above from Athea Labs under the trade name Digestase 900™.

"Circulating"—As used in this invention, circulating means to cause the contents of the animal waste facility to circulate, or to be stirred up. Conventional methods for circulating the contents of an animal waste facility include rotating blades or paddles, and aeration systems. A preferred method of circulation uses a commercial diffused air system to circulate the contents of the facility with compressed air (oxygen).

"Probiotic Mix" or "Probiotic Material"—Herein, probiotic is defined as promoting growth of microflora and organic digestion. The probiotic mix or material of the invention contains organic digesting microorganisms, preferably bacteria. Preferred organic digesting microorganisms are *lactobacillus, bacillus, bifidobacterium, streptococcus,* yeast, fungus and the like. Probiotic mix or material may also include lytic enzymes such as, proteases, lipases, cellulases, hemicelluases, phytases, amylases and the like. Probiotic mix or material may also include *yucca schidigera* and oligosaccharides.

Animal Waste Facility

The method of the invention treats a malodorous animal waste facility to reduce or eliminate odors and to produce an efficient system for degrading organic matter. The facility is treated to lower the sulfide content, and to enhance the growth conditions for organic digesting bacteria. In general, a facility where the filtered sulfide content measures 1 mg/l or greater is malodorous and inefficient in degrading organic matter. In order to rapidly reduce odor and convert the environment of the waste facility to conditions for efficient waste degradation, the process of the invention lowers the sulfide content. Organic digesting bacteria and enzymes are added at a time when the facility can efficiently utilize them to degrade organic waste.

The bacterial innoculum may be added to the waste material in the waste holding facility as a dry powder (e.g., lyophilized, active bacteria), in liquid suspension, in a sol or gel in a bolus, or encapsulated, or in any convenient dispensing medium.

Probiotic Feed Additive

Probiotic material may be administered to the animal in an amount effective to promote healthy gut microflora and increase organic digestion. This probiotic material can be provided to the animal by known methods, including orally. Administration provides the probiotic material to the animal's gastrointestinal tract to promote healthy gut microflora and improve organic material digestion.

Typically, probiotic material is introduced into the animal's gastrointestinal tract via a feed additive that is added to the animal's feed diet. Alternative methods of administration are liquid ingestion, paste or gel ingestion, boles, powder dusting surface of animal and the like. In addition to probiotic material, the feed additive may include, for example, carrier materials such as, limestone and wheat midds. The feed additive can be added to the animal's regular diet at a rate of 0.01 to 10 and preferably about 0.5 to 2.5 pounds of additive per ton of animal feed.

The feed additive may contain about 0.3% to about 20% by weight of probiotic material (probiotic premix). Preferably the feed additive contains 7% to 15% by weight probiotic premix and most preferably about 10% to 13% by weight. Probiotic material includes *lactobacillus, bacillus, bifidobacterium, streptococcus,* yeast, enzymes, fungi, Yucca, oligosaccharides and the like. These can include one or more of the organisms shown below in Table 1A below.

TABLE 1A

Examples of Probiotic Material.

| Lactobacillus | Bacillus | Bifidobacterium |
|---|---|---|
| casei | licheniformis | bifidum |
| plantarum | subtilus | pseudolongum |
| acidophilus | toyoi | thermophilus |
| fermentum | amyloliquefaciens | adolescentis |
| brevis | megaterium | animalis |
| lactis | pumilus | infantis |
| reuteri | coagulans | longum |
| bulgaricus | lentus | |
| cellobiosus | | |
| curvatus | | |
| delbruekii | | |
| helveticus | | |
| euterii | | |

| Streptococcus (Enterococcus) | Yeast | Other |
|---|---|---|
| faecium | Saccharomyces spp. | Pediococcus acidilactici |
| faecalis | Saccharomyces | Clostridium butyricum |
| cremoris | cerevisiae | Aspergillus oryzae |
| diacetylactis | | Aspergillus niger |
| intermedius | | Bacteroides amylophilus |
| lactis | | Bacteroides capillosus |
| thermophilus | | Bacteroides capillosus |
| | | Bacteroides ruminocola |
| | | Bacteroides suis |
| | | Leuconostoc mesenteroides |

TABLE 1A-continued

Examples of Probiotic Material.

*Pediococcus cerevisiae (damnosus)*
*Pediococcus pentosaceus*
*Pediococcus acidilacticii*
*Propionibacterium freudcareichii*
*Propionibacterium shermanii*
lytic enzymes
*Yucca schidigera*
Oligosaccharides When present in the feed or feed additive, probiotic enzymes may include lytic enzymes for digesting organic matter. Preferred lytic enzymes are proteases, lipases, hemicelluases, cellulases, esterases, xylanase, urease, phytase, amylases, and the like. The preferred enzymes or mixtures thereof are selected to aid in the digestion of the particular waste to be treated and on the diet of the animal.

Typically protease is present in the probiotic feed in an amount of 230–340 Protease Value (PV)/lb. In the feed additive, protease is typically present in an amount of 14,000–908,000 PV/lb and preferably 300,000–700,000 PV/lb and most preferably about 450,000 PV/lb.

Typically lipase is present in the probiotic feed in an amount of 55,000–82,000 United States Pharmacopoeia (USP)/lb. In the feed additive, lipase is typically present in an amount of 70–48,000 USP/gram and preferably 16,000 to 36,000 USP/gram and most preferably about 24,000 USP/gram.

Typically amylase is present in the probiotic feed in an amount of 6.8–10 Delft Value (DV)/lb. In the feed additive, amylase is typically present in an amount of 400–27,000 DV/lb and preferably 9,000 to 20,000 DV/lb and most preferably about 13,500 DV/lb.

Typically phytase is present in the probiotic feed in an amount of 100–550 Phytase Units (PU)/lb. In the feed additive, phytase is typically present in an amount of 5,000–1,000,000 PU/lb and preferably 50,000 to 800,000 PU/lb and most preferably about 200,000 PU/lb. Phytase also makes phosphorous in the feed more available to the animal.

Probiotic material such as organic digesting bacteria may be present in the basic feed diet in an amount of $1\times10^2$ CFU/gram to $1\times10^7$ CFU/gram and preferably $1\times10^4$ CFU/gram to $1\times10^6$ CFU/gram and most preferably about $7.5\times10^5$ CFU/gram. Organic digesting bacteria may be present in the feed additive in an amount of about $9.1\times10^7$ to $9.1\times10^{12}$ CFU/lb feed additive and preferably $9.1\times10^9$ to $9.1\times10^{11}$ CFU/lb feed additive and most preferably about $6.8\times10^{11}$ CFU/lb feed additive.

The probiotic *yucca schidigera* (yucca) can be optionally added to the probiotic feed additive. Yucca aids in lowering ammonia levels in the resulting organic waste. Yucca also stimulates probiotic material growth, particularly bacteria growth. The feed additive may contain about 0.3% to about 60% by weight of Yucca. Preferably the feed additive contains 4% to 30% by weight Yucca and most preferably about 13% by weight. Thus, yucca may be present in the feed additive in an amount of 10 to 1200 lbs/ton feed additive and preferably 80 to 600 lbs/ton of feed additive. Typically yucca can be present in the basic feed diet in an amount of 0.05 to 3.0 lbs/ton feed (2000 lbs feed) and preferably 0.1 to 1.5 lbs/ton feed.

Oligosaccharides is optionally added to the probiotic feed additive, such as, for example, sucrose, mannose, fructose, glucose, raffinose, stachyose, and verbascose oligosaccharides. These sugars stimulate gut microflora that aid in efficient organic digestion and odor reduction. Oligosaccharides can be present in the feed additive in the amount of 10% to 85% by weight and preferably 15% to 75% by weight and most preferably 60% by weight. Oligosaccharides may be added to the feed diet of the animals at a concentration of about 0.01% to about 1% by weight of the total feed. Thus, oligosaccharides may be present in the feed additive in an amount of 200 to 1700 lbs/ton feed additive and preferably 300 to 1500 lbs/ton of feed additive. Typically yucca can be present in the basic feed diet in an amount of 0.2 to 20 lbs/ton feed (2000 lbs feed) and preferably 1 to 2 lbs/ton feed.

A preferred probiotic premix for use in this invention, contains an equal mixture of three species of *Bacillus: licheniformis, amyloliquidifaciens,* and *subtilis* together with protease (10,000 PV units/g), amylase (300 DV units/g), lipase (2400 USP/mg) and is commercially available from Athea Labs, (Milwaukee, Wis.) under the trade name Digestase 900™.

The remainder of the feed additive contains carrier materials like limestone and wheat midds.

Sulfide Control

To rapidly lower the sulfide content of the animal waste in the facility, and/or to maintain sulfide gas emissions from the waste to below 10 ppm and preferably below 1 ppm, the animal waste is inoculated with sulfide-utilizing bacteria. The amount of bacteria in the innoculum will vary with specific treatment conditions, including temperature, pH, and the like. In general, the innoculum is sufficient to deliver approximately $10^5$–$10^{10}$ sulfide-utilizing bacteria per ml of waste fluid, and preferably about $10^6$–$10^8$ bacteria per ml. Also, alternate methods for reducing sulfide are available and can be used alone or in combination with the sulfide-utilizing bacteria innoculum such as, adding ferrous chloride and the like that chemically bind the sulfide in the waste or oxidize the sulfide in the waste.

The sulfide-utilizing bacterial innoculum can include one or more of the bacteria shown below in Table 1B. A preferred innoculum of sulfide-utilizing bacteria is commercially available from Syneco Systems, Inc. (St. Louis Park, Minn.) under the trade name Persnickety Brand 713™.

TABLE 1B

Examples of Sulfide-Utilizing Bacteria

| Purple Bacteria | Purple Non-Sulfur Bacteria | Green Sulfur Bacteria | Filamentous Green Bacteria | Colorless Sulfur and Other Bacteria |
|---|---|---|---|---|
| Chromatium | | | | |
| Chromatium Thiocystis | Rhodospirillum Rhodobacter | Chlorobium Prosthecochloris | Chloroflexus Chloronema | Beggiatoaceae Achromatium |

TABLE 1B-continued

Examples of Sulfide-Utilizing Bacteria

| Purple Bacteria Chromatium | Purple Non-Sulfur Bacteria | Green Sulfur Bacteria | Filamentous Green Bacteria | Colorless Sulfur and Other Bacteria |
|---|---|---|---|---|
| Thiospirillum Thiocapsa Lamprocystis Lamprobacter Thiopedia | Rhodopseudomonas Rhodomicrobium Rhodopila | Pelodictyon Ancalochloris Chloroherpeton | Oscillochloris | Thiobacterium Macromonma Thiospira Thiovulum Bilophocucus Thiobacillus Thiomicrospira Thiodendron Thiosphaera Acidiphilium Thermothrix Sulfolobus Acidianus |

The sulfide-utilizing bacteria in the inoculated facility is permitted to acclimate and to degrade sulfide compounds present in the facility. After a period of time sufficient to lower sulfide content and provide conditions for efficient growth and activity of organic digesting bacteria, organic digesting bacteria may be added to the facility. However, if a probiotic has been administered to the animal, adding organic digesting bacteria to the facility may not be necessary.

When used, the addition of organic digesting bacteria is preferably initiated when filtered sulfide content is less than 1 mg/l. Sufficient growth conditions to support some organic digesting bacterial growth can exist at higher filtered sulfide levels, for example, up to about 5 mg/l. It is generally understood that the organic digesting bacteria are more efficient at lower sulfide levels (e.g. less than 1 mg/l).

For a standard animal waste facility (about 1.5 million gallons of fluid waste) having an initial filtered sulfide content of about 1–150 mg/l, and a fluid waste temperature of about 70–75° F., after a first innoculum of about $10^6$–$10^8$ sulfide-utilizing bacteria per ml fluid waste, the filtered sulfide content is expected to decline to less than 1 mg/l in about 7 to 21 days. Under these conditions, to achieve a desirable efficiency of organic matter degradation without odors, the second innoculum (organic digesting bacteria) is preferably added about day 7–14. The time required to sufficiently reduce the sulfide level in the waste facility will vary according to factors including the condition of the facility at the time of treatment (such as initial sulfide content), composition of the organic matter, environmental conditions during treatment, (such as temperature and pH) and the like. In general, the sulfide-utilizing bacteria are most effective in lowering the sulfide content under conditions of neutral or near neutral pH (6.5–7.5) and warm temperatures (55–120° F.). While the time interval between addition of the two bacterium will vary between 0 and about 21 days, preferably, the time interval will range between 3 and 21 days, and most preferably between 7–14 days.

Organic Digesting Bacteria Addition

As stated earlier, when a probiotic is administered to the animal, a second innoculum of organic digesting bacteria may not be necessary and is an optional process step. Organic digesting bacteria are considered probiotic.

When used, the second innoculum of organic digesting bacteria includes one or more species of Bacillus, Clostridium, and Deinococcus. Species of Bacillus are preferred. Most preferred is a consortium of organic digesting bacteria which is capable of digesting or utilizing a variety of organic compounds. Also preferred are those organic digesting bacteria that produce lytic enzymes capable of degrading organic compounds found in animal waste. The second innoculum optionally and preferably further includes lytic enzymes for digesting organic matter. Preferred lytic enzymes include proteases, lipases, cellulases, hemicelluases, phytases and amylases.

A most preferred innoculum for use in this second innoculum of the invention, contains an equal mixture of three species of *Bacillus: licheniformis, amyloliquidifaciens,* and *subtilis* together with protease (10,000 Protease Value (PV) units/g), amylase (300 Delft Value (DV) units/g), and lipase (2400 United States Pharmacopoeia (USP)/mg) and is commercially available from Athea Labs, (Milwaukee, Wis.) under the trade name Digestase 900™.

Circulation

In a deep pit barn, waste circulation is not generally recommended. Also, when a probiotic is administered to the animal, circulation of the pit material is not necessary. This is due to the fact that the organic digesting material is uniformly distributed throughout the pit material.

During the second innoculum, and continuing during the organic digesting phase of the treatment, it is preferred to circulate the fluid material of the facility in order to maximize the effect of the bacteria and enzymes. Circulation may be achieved by a number of known methods, including paddle, blade or fluid systems. A most preferred circulation system is a diffused air system placed in, and preferably at the bottom of the facility to produce a plume of air which rises to the surface to create a mixing action. Suitable air diffusion systems are commercially available, for example, from Clean Flow Laboratories (Plymouth, Min.). An aspirator-type system which causes circulation by injecting air at the surface of the facility is commercially available from Aeration Industries (Minneapolis, Minn.).

A useful diffuser system produces an output of about 10 cubic ft/minute (cfm) per surface acre of the facility. This is accomplished with a 10 psi, 10 cfm rotary vane compressor and two diffusers.

Maintenance

To maintain an animal waste facility capable of efficiently degrading large amounts of animal waste (e.g., amounts that would typically overload a non-treated facility's degradation capacity) with reduced odor and reduced solids build-up, the sulfide-utilizing innoculum and organic digesting innoculum are periodically applied to the facility. However, when the probiotic is administered to the animals, the addition of additional organic digesting innoculum may not be necessary. The probiotic is typically fed to the animals on a regular, preferably, continuous basis.

The specific time interval between periodic applications of the process of the invention varies with the specific conditions of the facility: e.g., amount of new animal waste deposited, the size of the facility, the environmental conditions since last application, and the like. Generally, the lowered-sulfide waste sulfide gas emissions in the barn are maintained below about 10 ppm and preferably below about 1 ppm (time weighted average) based on OSHA method # ID-141. Lowered-sulfide waste ammonia gas emissions in the barn are maintained below about 35 ppm and preferably below about 5 ppm (time weighted average) based on OSHA method # ID-I 88.

In general, for most commercial facilities, the innoculum are applied at about monthly intervals to maintain a healthy biomass capable of degrading large amounts of animal waste in a shortened period of time as compared with a non-treated facility.

Combined Probiotic Feed Additive and Sulfide Utilizing Bacterium

The combined use of a probiotic feed additive and a sulfide utilizing inoculation to the waste material provides synergistic benefits for animal production, especially swine production. As shown in Example 4, the use of a probiotic feed and sulfide utilizing inoculation reduces hydrogen sulfide and ammonia concentrations in the waste pit, barn and surrounding area. The following tables summarize the effects of hydrogen sulfide and ammonia at specific concentrations on both humans and swine. Reducing the concentration of these compounds at the waste facility is particularly health promoting for humans and animals. The following tables are taken from a 1995 publication by the Minnesota Department of Agriculture entitled "Manure Management Alternatives: A Supplemental Manual" and illustrate the effect of hydrogen sulfide and ammonia on humans and swine are various concentrations.

TABLE 2

Effects of Hydrogen Sulfide on Humans

| Gas Expose | Effect |
|---|---|
| 5 ppm | Recommended maximum level |
| 10 ppm | Eye irritation |
| 20 ppm for more than 20 minutes | Irritation to the eyes, nose and throat |
| 50–100 ppm | Vomiting, nausea, diarrhea |
| 200 ppm for 1 hour | Dizziness, depression of central nervous system, increases susceptibility to pneumonia |
| 500 ppm for 30 minutes | Nausea, excitement, unconsciousness |
| 600+ ppm | Rapid death |

TABLE 3

Effects of Hydrogen Sulfide on Pigs

| Gas Exposure | Effect |
|---|---|
| 10 ppm | Recommended maximum level |
| 20 ppm exposed continually | Fear of light, loss of appetite, nervousness |
| 200 ppm | Possible pulmonary edema (water in the lungs) with breathing difficulties and possible loss of consciousness and death |

TABLE 4

Effects of Ammonia on Humans

| Gas Exposure | Effect |
|---|---|
| 5 ppm | Lowest level detectable by smell |
| 7–10 ppm | Recommended maximum level |
| 6–20+ ppm | Eye irritation, respiratory problems |
| 40 ppm | Headache, nausea, reduced appetite |
| 100 ppm for 1 hour | Irritation to mucous surfaces |
| 400 ppm for 1 hour | Irritation to nose and throat |

TABLE 5

Effects of Ammonia on Pigs

| Gas Exposure | Effect |
|---|---|
| 25 ppm | May induce respiratory and other illness. Recommended maximum level |
| 50 ppm | Reductions in performance and health. Long term exposure increases possibility of pneumonia and other respiratory diseases |
| 100 ppm | Sneezing, salvation and loss of appetite, thereby reducing animal performance. |
| 300+ ppm | Immediate irritation of nose and mouth. Prolonged exposure causes extremely shallow and irregular breathing followed by convulsions. |

The use of the combined treatment of the invention, a probiotic feed additive and sulfide utilizing inoculation reduces exposure to noxious and unhealthy volatile gases and results in increased feed efficiency and average daily weight gain. This combination also results in decreased back fat, respiratory infections, and decreased need for antibiotics. This combination also decreases the total solids in the waste pit, allowing the waste pit to be pumped out more easily than untreated waste pits having higher solids content.

EXAMPLES

The invention may be more fully understood with reference to the following examples, which are not intended to limit the scope of the invention.

Example I

Bioremediation Of Two-Stage Anaerobic Swine Waste Lagoon

A process utilizing selected bacteria, enzymes and a diffused air system to control the ecology of a swine waste storage lagoon is described below.

A. Initial Characterization of Waste Facility

Manure from a two-stage anaerobic swine waste facility, consisting of a primary lagoon (approximately 1–1.5 million gallons) and secondary lagoon (approximately 2–2.5 million gallons), was sampled to identify baseline figures for filtered sulfide, sulfate, ammonia, volatile fatty acids (V.F.A.), chemical oxygen demand (C.O.D.), and pH. Fluid temperature of the lagoon during the treatment period averaged about 70–75° C.

At four locations throughout the primary lagoon and two locations throughout the secondary lagoon, a vertical cross section sample of the entire depth was taken. The samples were obtained by lowering a hollow PVC tube, fitted with a stopper at the bottom end of the tube, into the lagoons to a depth of about six feet. The tube was allowed to fill completely and the stopper activated to seal off the lower end of the tube. The tube was brought to the surface where the sample was transferred into one liter bottles which was then analyzed. Sampling and analysis was performed by an independent testing facility, Baumgartner Environics, Inc. (Olivia, Minn.). Standard analyses were used as indicated below:

| | |
|---|---|
| sulfide | EPA 375.4 |
| C.O.D. | EPA 410.1 |
| ammonia | EPA 350.3 |
| total solids | EPA 160.4 |
| volatile solids | EPA 160.4 |
| sulfate | EPA 375.4 |
| volatile fatty acids | J. Food Science 51:3, 1986 |

The data, expressed as the average analysis for the samples taken in mg/L of sample, are shown below in Table 2 (primary lagoon) and Table 3 (secondary lagoon).

B. Step 1: Inoculation With Sulfide-Utilizing Bacteria

A commercial, liquid consortium of sulfide-utilizing bacteria (Persnickety Brand 713™) was obtained from Syneco Systems, Inc. and used to inoculate the lagoons. The bacterial consortium was added to the lagoons to result in a final concentration of $10^6$–$10^8$ bacterial counts/mL of estimated lagoon content volume. The bacteria were allowed to oxidize the sulfides present in the lagoon over a 10 day period.

C. Step 2: Inoculation With Organic Digesting Bacteria

A powdered consortium of organic digesting bacteria (Digestase 900™) was obtained from Athea Labs (Milwaukee, Wis.). The mixture also contained lytic enzymes as described above. This mixture was suspended in warm water and added to the lagoons 10 days after addition of the anaerobic sulfide-utilizing bacteria. This second treatment innoculum contained bacteria from the genus Bacillus, particularly a mixture of the species *licheniformis, amyloliquifaciens, megaterium, pumilus* and *subtilis*, as well as the enzymes protease, amylase, and lipase. The bacterial/enzymatic consortium was added to the lagoons to result in a final concentration of $10^3$–$10^4$ bacterial counts/mL of estimated content of the lagoon.

A low pressure rotary vane compressor with optimum operating output of 10 psi and 10 cfm was connected to two manifolds each fitted with a 1–30 micron diffuser. The diffuser manifolds were placed equidistant from each other on the bottom of the lagoon to create a plumes of air which would rise to the surface thus mixing the waste and increasing contact time with the organisms.

Ten days after the initiation of the second treatment inoculation with organic digesting bacteria (twenty days after the initiation of the first treatment inoculation with sulfide-utilizing bacteria) each lagoon was sampled and analyzed as described above. The data are shown below in Tables 7 and 8.

TABLE 7

Primary Lagoon

| Stage of Analysis | Sulfide mg/L (ppm) | Sulfate mg/L | Ammonia mg/L | C.O.D. mg/L | V.F.A. mg/L | pH |
|---|---|---|---|---|---|---|
| Initial characterization (Day 0) | 3.29 | 238 | 5124 | 1438 | 1860 | 7.79 |
| After Step 1 Treatment (Day 10) | 2.1 | | | | | |
| After Step 2 Treatment (Day 20) | .82 | 47.5 | 1287 | 4395 | 988 | 7.57 |
| Percent Change | −75 | −80 | −75 | +206 | −47 | |

TABLE 8

Secondary Lagoon

| Stage of Analysis | Sulfide mg/L (ppm) | Sulfate mg/L | Ammonia mg/L | C.O.D. mg/L | V.F.A. mg/L | pH |
|---|---|---|---|---|---|---|
| Initial Characterization (Day 0) | .55 | 165 | 4323 | 1298 | 2800 | 8.17 |
| After Stage 2 Treatment (Day 20) | .35 | 47.5 | 1371 | 3160 | 1170 | 7.7 |
| Percent Change | −36 | −71 | −68 | +143 | −58 | |

Example 2

Bioremediation of Anaerobic Dairy Waste Lagoon

A process utilizing selected bacteria, enzymes and a diffused air system to control the ecology of a dairy waste storage lagoon is described below.

A. Initial Characterization of Waste Facility

An initial characterization of the contents of the dairy waste facility was conducted as described above for Example 1. Average temperature of the liquid waste during the treatment period was about 60° F.

Analysis of sulfide was performed on samples with solids rather than on filtered samples as described for Example 1. It is generally understood that the correlation between filtered and non-filtered sulfide content is that the filtered level is approximately 30–40% of the non-filtered level. The data shown below in Table 4 shows the analyzed non-filtered sulfide level, with the estimated filtered sulfide level shown in parentheses.

B. Step 1: Inoculation With Sulfide-Utilizing Bacteria

The dairy waste lagoon was inoculated with a consortium of sulfide-utilizing bacteria using the compositions and methods described above for Example 1.

C. Step 2: Inoculation With Organic Digesting Bacteria

At 15 days after the first treatment with the sulfide-utilizing innoculum, the dairy waste in the facility was treated with a second innoculum of organic digesting bacteria and lytic enzymes with the diffuser system, as described above for Example 1.

Thirty days after the initiation of the first treatment with sulfide-oxidizing bacteria, the dairy lagoon was sampled and analyzed as described above. The data are shown below in Table 9.

TABLE 9

Daily Waste Facility

| Stage of Analysis | Sulfide* mg/L | Percent Total Solids | Percent Volatile Solids | Ammonia mg/L | C.O.D. mg/L |
|---|---|---|---|---|---|
| Initial Characterization (day 0) | 27.5 (8.25) | 5.03 | 82 | 500 | 6160 |
| After Step 1 Treatment (30 days) | 11 (3.3) | 3 | 78 | 1371 | 22,000 |
| Percent Change | −60 | −40 | −5 | +174 | +257 |

*Sulfides were analyzed on non-filtered samples.
Estimates of filtered-sample values are given in parentheses.

Example 3

Bioremediation of Anaerobic Swine Waste Lagoon

A process utilizing selected bacteria, enzymes and a diffused air system to control the ecology of a further swine waste storage lagoon is described below.

A. Initial Characterization of Waste Facility

An initial characterization of the contents of the swine waste facility was conducted as described above for Example 1. Average temperature of the liquid waste during the treatment period was about 60° F.

B. Step 1: Inoculation With Sulfide-Utilizing Bacteria

The swine waste lagoon was inoculated with a consortium of sulfide-utilizing bacteria using the compositions and methods described above for Example 1.

C. Step 2: Inoculation With Organic Digesting Bacteria

At 9 days after the first treatment with the sulfide-utilizing innoculum, the waste in the facility was treated with a second innoculum of organic digesting bacteria and lytic enzymes with the diffuser system, as described above for Example 1.

25 days after the initiation of the first treatment with sulfide-oxidizing bacteria, the lagoon was sampled and analyzed as described above. The data are shown below in Table 10.

TABLE 10

Sulfide Levels

| Stage of Analysis | Filtered Sulfide (mg/L) | Ammonia (mg/L) | COD (mg/L) | VFA (mg/L) |
|---|---|---|---|---|
| Initial Characterization (Day 0) | 6.9 | 418.8 | 2025.9 | 773.6 |
| After Step 1 Treatment (Day 9) | 1.3 | 976.0 | 1900.0 | 927.0 |
| After Step 2 Treatment (Day 25) | 0.23 | 1113 | 1710.0 | 892.0 |
| Percent Change | −97 | +166 | −16 | +15 |

Example 4

Combination Feed Additive and Bioremediation of Anaerobic Swine Waste Pit

A. Facilities and Animal Selection

Modem crossbred lean genotype barrows and gilts from a commercial three-site pork production system in Iowa were used in this study. The finishing barns used were tunnel-ventilated facilities containing 40 pens (20 per side) in one continuous airspace. Each pen measured 9'7" by 19'1.375" and was equipped with one 2 space wet-dry feeder. Flooring consisted of totally slatted concrete with a deep continuous pit below each side of the barn. The barns were managed all in-all out. The two barns utilized in this study were the only barns on this site. The site was managed in an all in-all out manner as well.

Eight hundred and sixty-two (862) mix-sex pigs from a single source nursery were placed in Barn A (Treatment Barn). Eight hundred and forty (840) mix-sex pigs from the same single source nursery were placed in Barn B (Control Barn). Stocking density in both barns was approximately 7.2 sq. ft/pig. Both Barn A and B were given 10 acclimation days in their location for the manager to size and sort according to farm protocol. On the tenth day, 250 pigs from each barn were individually weighed. The number of individual pigs weighed was based on the following assumptions and statistical calculation:

| Assumptions for Calculating Sample Size |
|---|
| A) The calculations total weight gain throughout the trial period.
B) The weight gain difference that we desired to be able to detect was a five pounds or greater weight difference.
C) The standard deviation of weight gain used was 20 pounds.
Calculation: $n = 2[(Z_\alpha - Z_\beta) S/(X_e - X_c)]^2$
$n$ = estimated sample size for each barn
$Z_\alpha$ = statistical means of reducing type I errors
$Z_\beta$ = statistical means of reducing type II errors
S = standard deviation common to both treatment and control groups
$X_e$ = estimate of mean of outcome in treatment group
$X_c$ = estimate of mean of outcome in control group
Example: $n = 2[(1.96 - \{-0.84\})20/(245 - 240)]^2$
$n$ = 250 pigs per barn/treatment |

The study period was 86 days in length for both barns, beginning on first weigh day.

B. Feed Protocol

Animals in both barns were supplied with the same basic swine feed diet. The basic swine feed diet is as follows:

Summer Feed Ration/ton feed

| Ration | Corn | Soybean | Added Fat % | Total Lysine % |
|---|---|---|---|---|
| I | 1,268.55 | 566 | 3.45 | 1.10 |
| II | 1,377.00 | 469 | 3.15 | 0.98 |
| III | 1,501.45 | 345 | 3.00 | 0.78 |
| IV | 1,574.60 | 254 | 1.45 | 0.67 |
| V | 1,730.34 | 196 | 0.5 | 0.58 |

Winter Feed Ration/ton feed

| Ration | Corn lbs | Soybean lbs | Added Fat % | Total Lysine % |
|---|---|---|---|---|
| I | 1,268.55 | 566 | 5.20 | 1.13 |
| II | 1,377.00 | 469 | 4.85 | 1.00 |
| III | 1,501.45 | 345 | 4.75 | 0.80 |
| IV | 1,574.60 | 254 | 3.20 | 0.68 |
| V | 1,730.34 | 196 | 1.70 | 0.60 |

Ration I—Feed to pigs weighing between about 45–64 pounds.
Ration II—Feed to pigs weighing between about 64–108 pounds.
Ration III—Feed to pigs weighing between about 108–173 pounds.
Ration IV—Feed to pigs weighing between about 173–237 pounds.

Ration V—Feed to pigs weighing between about 237–260 pounds.

Animals in the treatment barn (Barn A) were additionally supplied with a diet that that included a probiotic feed additive. The probiotic feed additive contained probiotic organisms and *Yucca schidigera* (shown in Table 11). The feed additive was added to rations I and II at a rate of 1.5 pound probiotic feed additive to one ton of feed. The feed additive was added to rations III–V at a rate if 1.0 pounds per ton of feed. The probiotic bacillus premix used in the study and shown in the tables below contains an equal mixture of three species of *Bacillus: licheniformis, amyloliquefaciens, megaterium, pumilus* and *subtilis* together with protease (10,000 PV units/g), amylase (300 DV units/g), lipase (2400 USP/mg), and is commercially available from Athea Labs, (Milwaukee, Wis.) under the trade name Digestase 900™. Yucca schidigera is commercially available under the tradename BioSupreme™ and was obtained from Agro Industries in San Diego, Calif. Table 12 shows a useful feed additive without the optional feed additive Yucca schidigera.

TABLE 11

Formula for feed additive containing *Yucca schidigera*

Bacillus/Yucca Product Growers (Finishers)

| Ingredients | Bacteria | Weight | % |
|---|---|---|---|
| Extruded Wheat Midds | | 816 | 40.8 |
| #2 Limestone | | 720 | 36.0 |
| Bacillus Premix | *Bacillus amyloliquefaciens* | 200 | 10.0 |
| | *Bacillus licheniformis* | | |
| | *Bacillus subtilus* | | |
| | *Bacillus megaterium* | | |
| | *Bacilius pumilus* | | |
| | Protease Enzyme | | |
| | Amylase Enzyme | | |
| | Lipase Enzyme | | |
| *Yucca schidigera* | | 264 | 13.2 |
| Total | | 2000 | 100.0 |

TABLE 12

Formula for feed additive containing *Yucca schidigera*

Bacillus Only Growers (Finishers)

| Ingredients | Bacteria | Weight | % |
|---|---|---|---|
| Extruded Wheat Midds | | 956 | 47.8 |
| #2 Limestone | | 844 | 42.2 |
| Bacillus Premix | *Bacillus amyloliquefaciens* | 200 | 10.0 |
| | *Bacillus licheniformis* | | |
| | *Bacillus subtilus* | | |
| | *Bacillus megaterium* | | |
| | *Bacillus pumilus* | | |
| | Protease Enzyme | | |
| | Amylase Enzyme | | |
| | Lipase Enzyme | | |
| Total | | 2000 | 100.0 |

C. Results

Swine Health

Both Barns A and B had a respiratory outbreak during the trial period.

Both barns received a water-soluble antibiotic (Barn A for 10 days and Barn B for 12 days) and individual animal injections as clinical signs were noted. Animals in Barn B (control barn) also received one two-week treatment of Chlortetracycline at therapeutic levels. Animals in Barn A (treatment barn) did not require any chlortetracycline. A greater number of pigs were individually injected with antibiotics in Barn B (control) verses Barn A (treatment) 230 vs. 113 respectively. Mortality rates for both barns were similar; Barn A lost 43 to death or culling (4.98% mortality rate) verses Barn B lost 39 to death or culling (4.64% mortality rate).

Allotment and Final Body Weights

At allotment, body weights were not different ($p>0.31$) between Barn A and Barn B, with mean placement weights of 51.57 and 50.75 lbs., respectively. Significant differences ($p<0.05$) in body weight were detected at final weights (Day 86) between animals in the treatment barn, Barn A at 208.50 lbs and those in the control barn, Barn B at 195.59 lbs.

Average Daily Gain (ADG)

The average daily gain of all pigs was included for the entire trial. Pigs that died or were culled had their last weight recorded at time of removal. This provided data for all pigs and eliminated bias that can occur with missing data. This data was then used in the feed calculations to assure that all animals were included in the consumption of feed during their lifetime on this trial.

The difference in ADG between animals in the treatment barn, Barn A and in the control barn B was significant ($p<0.05$). Barn A performed at a 1.84 ADG and Barn B at a 1.71 ADG.

Feed Conversion

There was a numerical difference in the feed efficiencies between Barn A at 2.596 lb feed fed/lb gained and Barn B at 2.72 lb feed fed/lb gained.

Gas Monitoring

The parameters that were tested in the control barn and the treatment barn are listed below:

1. Ammonia gas inside the barn
2. Hydrogen sulfide inside the barn

An STX-70 gas-monitoring instrument monitored the ammonia in the building. Ammonia was measured at seven different locations in the building. Hydrogen sulfide was measured with an Arizona Instruments Jerome meter at each of these locations also. Each gas was measured once a week. The results of the study are shown in the tables that follow.

TABLE 13

Ammonia Readings (ppm)

| Date | Control Barn B | Treatment Barn A |
|---|---|---|
| Apr 01 | 13.22 | 12.22 |
| Apr 08 | 15.11 | 19.33 |
| Apr 16 | 14.22 | 19.67 |
| May 05 | 21.22 | 16.78 |
| May 13 | 12.11 | 7.56 |
| May 21 | 7.89 | 3.89 |
| May 28 | 6.67 | 2.78 |
| Jun 07 | 7.89 | 5.33 |
| Jun 17 | 8.78 | 6.11 |

TABLE 14

Hydrogen Sulfide Readings (ppb)

| Date | Control Barn B | Treatment Barn A |
|---|---|---|
| Apr 02 | 297.33 | 210.80 |
| Apr 16 | 634.00 | 537.33 |
| May 17 | 787.33 | 515.33 |
| Jun 23 | ND | 70.13 |
| Jun 30 | 136.33 | ND |

ND = Not Determined

Wet Chemistry Results for Volatile Fatty Acids and Total Solids

| Volatile fatty acids: | | | |
|---|---|---|---|
| Treatment Barn | | Control Barn | |
| Baseline: | 8,375 mg/l | Baseline: | 12,895 mg/l |
| Day 90 | 13,480 mg/l | Day 90 | 23,800 mg/l |
| % difference | +62% | % difference | +85% |

| Total Solids: | | | |
|---|---|---|---|
| Treatment Barn | | Control Barn | |
| Baseline: | 9.3% | Baseline: | 13.4% |
| Day 90 | 5.5% | Day 90 | 10.5% |
| % difference | −43% | % difference | −22% |

Baseline was established Day 1 for wet chemistry analysis. Lower total solids in the treatment barn provided for easier pumping of the waste material than in the control barn. Lower volatile fatty acids in the treatment barn attributed to better animal health.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A process for treating animal waste comprising the steps of:
   (a) administering to an animal a probiotic material capable of promoting organic digestion; and
   (b) adding an innoculum comprising sulfide-utilizing bacteria to a waste produced by the animal.

2. The process of claim 1, wherein the probiotic material comprises one or more species of probiotics listed in Table 1A.

3. The process of claim 1, wherein the probiotic material comprises one or more species of Baccillus, Clostridium, and Deinococcus.

4. The process of claim 3, wherein the probiotic material comprises one or more species of Bacillus.

5. The process of claim 4, wherein the probiotic material comprises a mixture of the species *licheniformis, pumilus,* and *subtilis.*

6. The process of claim 1, wherein said administering is oral.

7. The process of claim 2, wherein said probiotic material comprises lytic enzymes.

8. The process of claim 7, wherein said lytic enzymes are selected from the group consisting of proteases, lipases, hemicelluases, cellulases, esterases, xylanase, urease, phytase, amylases or mixtures thereof.

9. The process of claim 2, wherein said probiotic material comprises *yucca schidigera.*

10. The process of claim 2, wherein said probiotic material comprises oligosaccharides.

11. The process of claim 1, wherein said innoculum comprises one or more species of sulfide-utilizing bacteria listed in Table 1B.

12. The process of claim 11, wherein said innoculum comprises one or more species of Chromanium, Rhodospirillum, Chlorobium, Chloroflexus, and Thiobacillus.

13. The process of claim 1, further comprising the step of adding a second innoculum of an organic digesting bacteria to the animal waste.

14. The process of claim 13, wherein said second innoculum comprises one or mote species of Baccillus, Clostridium, and Deinococcus.

15. The process of claim 14, wherein said second innoculum further comprises lytic enzymes.

16. The process of claim 15, wherein said lytic enzymes are selected from the group consisting of proteases, lipases, hemicelluases, cellulases, esterases, xylanase, urease, phytase, amylases or mixtures thereof.

17. A process for treating animal waste comprising the steps of:
   (a) administering to an animal a probiotic feed comprising:
       (i) organic digesting bacteria; and
       (ii) lytic enzymes;
   (b) adding an innoculum comprising sulfide-utilizing bacteria to a waste produced by the animal.

18. The process of claim 17, wherein, the probiotic feed further comprises *yucca schidigera.*

19. The process of claim 17, wherein the organic digesting bacteria comprises one or more species of Baccillus, Clostridium, and Deinococcus.

20. The process of claim 19, wherein the organic digesting bacteria is fed to the animal at a concentration of $1\times10^2$ to $1\times10^7$ CFU/gram feed.

21. The process of claim 19, wherein the organic digesting bacteria is fed to the animal at a concentration of $1\times10^4$ to $1\times10^6$ CFU/gram feed.

22. The process of claim 19, wherein the organic digesting bacteria is fed to the animal at a concentration of about $7.5\times10^5$ CFU/gram feed.

23. The process of claim 17, wherein the lytic enzymes are selected from the group consisting of proteases, lipases, hemicelluases, cellulases, esterases, xylanase, urease, phytase, amylases or mixtures thereof.

24. The process of claim 23, wherein the protease is present in the probiotic feed in an amount of 230–340 PV/lb feed.

25. The process of claim 23, wherein the lipase is present in the probiotic feed in an amount of 55,000–82,000 USP/lb feed.

26. The process of claim 23, wherein the amylase is present in the probiotic feed in an amount of 6.8–10 DV/lb feed.

27. The process of claim 23, wherein the phytase is present in the probiotic feed in an amount of 100–550 PU/lb feed.

28. The process of claim 18, wherein the *yucca schidigera* is present in the probiotic feed in an amount of about 0.05 to 3.0 lbs/ton feed.

29. The process of claim 18, wherein the *yucca schidigera* is present in the probiotic feed in an amount of about 0.1 to 1.5 lbs/ton feed.

30. The process of claim 17, wherein the probiotic feed further comprises oligosaccharides.

31. The process of claim 30, wherein: the oligosaccharides is present in the probiotic feed in an amount of about 0.2 to 20 lbs/ton feed.

32. The process of claim 31, wherein the oligosaccharides is present in the probiotic feed in an amount of about 1 to 2 lbs/ton feed.

33. A process for treating animal waste comprising the steps of:
(a) administering to an animal a probiotic feed additive comprising:
(i) organic digesting bacteria; and
(ii) lytic enzymes;
(b) adding an innoculum comprising sulfide-utilizing bacteria to a waste produced by the animal.

34. The process of claim 33, wherein, the probiotic feed additive further comprises *yucca schidigera*.

35. The process of claim 33, wherein the organic digesting bacteria comprises one or more species of Baccillus, Clostridium, and Deinococcus.

36. The process of claim 35, wherein the organic digesting bacteria is fed to the animal at a concentration of $9.1 \times 10^7$ to $9.1 \times 10^2$ CFU/lb feed additive.

37. The process of claim 35, wherein the organic digesting bacteria is fed to the animal at a concentration of $9.1 \times 10^9$ to $9.1 \times 10^{11}$ CFU/lb feed additive.

38. The process of claim 35, wherein the organic digesting bacteria is fed to the animal at a concentration of about $6.8 \times 10^{11}$ CFU/lb feed additive.

39. The process of claim 33, wherein the lytic enzymes are selected from the group consisting of proteases, lipases, hemicelluases, cellulases, esterases, xylanase, urease, phytase, amylases or mixtures thereof.

40. The process of claim 39, wherein the protease is present in the probiotic feed additive in an amount of 14,000–910,000 PV/lb feed additive.

41. The process of claim 39, wherein the lipase is present in the probiotic feed additive in an amount of 70–48,000 USP/gram feed additive.

42. The process of claim 39, wherein the amylase is present in the probiotic feed additive in an amount of 400–27,000 DV/lb feed.

43. The process of claim 39, wherein the phytase is present in the probiotic feed additive in an amount of 5000–1,000,000 PU/lb feed.

44. The process of claim 34, wherein the *yucca schidigera* comprises about 10 to 1200 lbs/ton feed additive.

45. The process of claim 34, wherein the *yucca schidigera* comprises about 80 to 600 lbs/ton feed additive.

46. The process of claim 33, wherein the probiotic feed further comprises oligosaccharides.

47. The process of claim 46, wherein the oligosaccharides comprises about 200 to 1700 lbs/ton feed additive.

48. The process of claim 47, wherein the oligosaccharides comprises about 300 to 1500 lbs/ton feed additive.

49. A probiotic feed additive comprising:
organic digesting bacteria;
lytic enzymes; and
*yucca schidigera*.

50. The probiotic feed additive of claim 49, wherein, the lytic enzymes are selected from the group consisting of proteases, lipases, hemicelluases, cellulases, esterases, xylanase, urease, phytase, amylases or mixtures thereof.

51. The probiotic feed additive of claim 49, wherein, the organic digesting bacteria comprises a bacillus mixture of the species *licheniformis, pumilus,* and *subtilis*.

52. The probiotic feed additive of claim 49, further comprising oligosaccharides.

53. The probiotic feed additive of claim 51, wherein, the organic digesting bacteria is present at a concentration of $9.1 \times 10^9$ to $9.1 \times 10^{11}$ CFU/gram feed additive.

54. The probiotic feed additive of claim 50 wherein,
the protease is present in an amount of 300,000–700,000 PV/lb feed additive;
the lipase is present in an amount of 16,000 to 36,000 USP/gram feed additive;
the amylase is present in an amount of 9,000 to 20,000 DV/lb feed additive; and
the phytase is present in an amount of 50,000 to 800,000 PU/lb feed additive.

55. The probiotic feed additive of claim 49, wherein, the *yucca schidigera* is present in an amount of about 80 to 600 lbs/ton feed additive.

56. The probiotic feed additive of claim 52, wherein, the oligosaccharides are present in an amount of about 300 to 1500 lbs/ton feed additive.

* * * * *

UNITED STATES PATENT AND TRADEMARK OFFICE
CERTIFICATE OF CORRECTION

PATENT NO. : 6,410,305 B1
DATED : June 25, 2002
INVENTOR(S) : Miller et al.

It is certified that error appears in the above-identified patent and that said Letters Patent is hereby corrected as shown below:

Column 2,
Line 39, start new paragraph with "Innoculum"

Column 15,
Line 44, replace "containing Yucca:" with -- containing no Yucca --

Signed and Sealed this

Twenty-ninth Day of April, 2003

JAMES E. ROGAN
*Director of the United States Patent and Trademark Office*